UNITED STATES PATENT OFFICE.

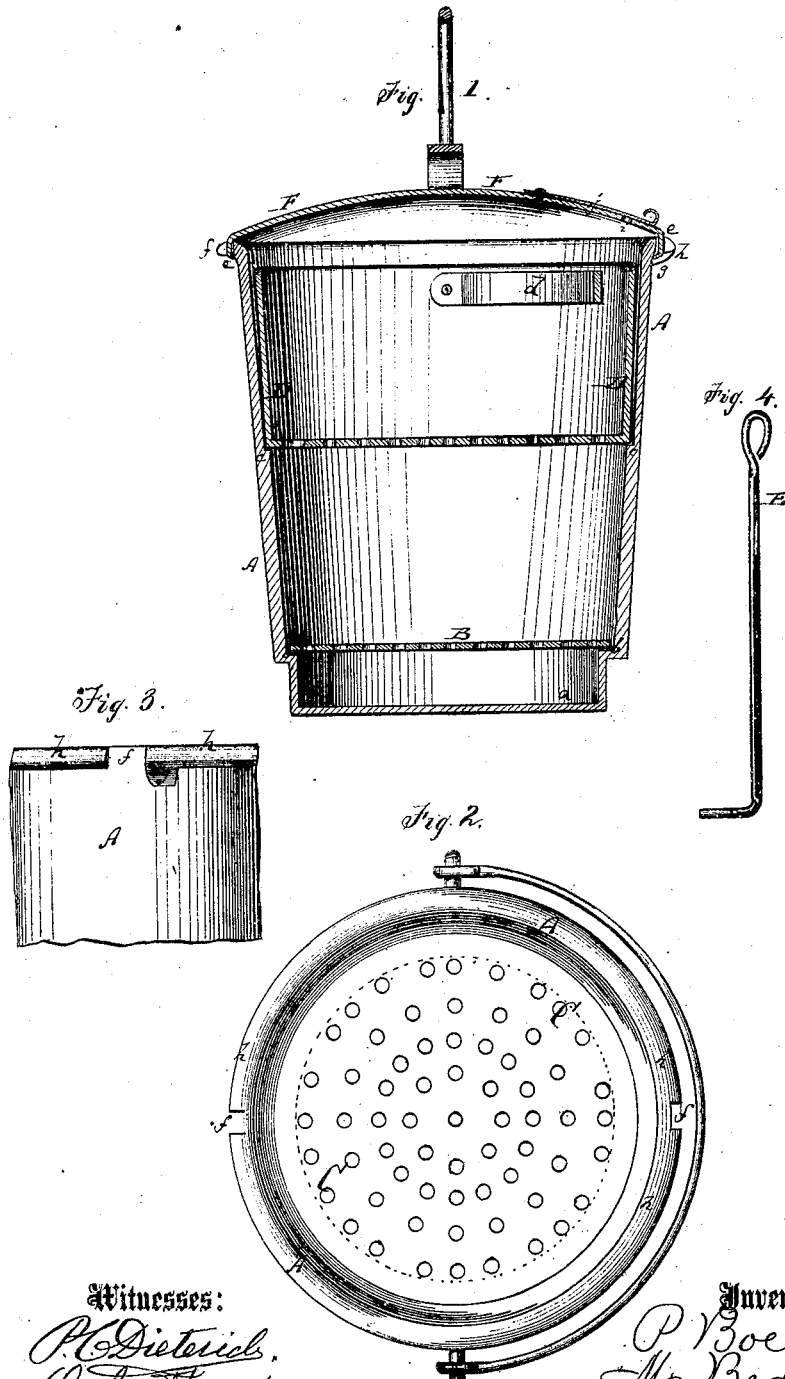

PETER BOESEN AND MICHAEL BEDESSEM, OF KENOSHA, WISCONSIN.

IMPROVEMENT IN CULINARY BOILERS.

Specification forming part of Letters Patent No. 113,011, dated March 28, 1871.

*To all whom it may concern:*

Be it known that we, PETER BOESEN and MICHAEL BEDESSEM, of Kenosha, in the county of Kenosha and State of Wisconsin, have invented a new and Improved Culinary Vessel; and we do hereby declare that the following is a full, clear, and exact description thereof, which will enable others skilled in the art to make and use the same, reference being had to the accompanying drawing, forming part of this specification, in which—

Figure 1 represents a vertical central section of our improved culinary vessel. Fig. 2 is a plan or top view of the same, showing it uncovered. Fig. 3 is a detail side view of portions of the vessel. Fig. 4 is a detail side view of the hook for connecting the upper steaming-vessel with the lower perforated plate.

Similar letters of reference indicate corresponding parts.

This invention relates to a new culinary vessel, which has for its object to enable the treatment of food by suitable process, and of several articles of food in one vessel.

Our invention consists in certain improvements, which will first be described in connection with all that is necessary to their full understanding, and then clearly pointed out in the claims.

A in the drawing represents a culinary vessel, made of iron or other material, of suitable form and size. The central part of its bottom $a$ is made lower than the outer portion of the same, to fit into the apertures of the stove-top in the ordinary manner.

The shoulder $b$, formed by this depressed bottom within the vessel A, can be used as a support for a perforated plate, B, whenever it is desired to prepare food by the steam from a small quantity of water contained in the lowermost portion of the boiler, the food in that case resting on the plate B.

Some articles of food are best prepared by being first boiled within water, and then exposed merely to steam. By the use of the plate B this mode of preparation can be carried out as in one process. The food is placed upon the plate B and sufficient water into the vessel A to inclose the food, the quantity of water being such that it will, by evaporation, be reduced in due time to leave the food dry on the plate and merely steam it.

Within the vessel A, about midway between the shoulder $b$ and the top, is formed a shoulder, $c$, which serves as a support for another perforated plate, C. (Shown in Fig. 2, but not in Fig. 1.)

The object of this plate C is to enable the cooking, at the same time and within one vessel, of several kinds of food, either by boiling both in water or by merely boiling the lower and steaming the upper, or steaming both, as may be required.

In place of the plate C, a vessel, D, having a perforated bottom may be employed with substantially the same effect.

The vessel D is more convenient, as it will inclose the food and facilitate the removal of the same, being provided with a handle, $d$, as shown.

A hook, E, may be employed to connect the plates B and C or the bottom of D with B, so that both may at once be removed from the vessel A.

F is the cover of the vessel A. It has at its edge inwardly-projecting ears $e$ $e$, which enter notches $f$ in the outer flange, $h$, at the top of the vessel A, and are then turned under said flange for the purpose of locking the cover.

A stop, $g$, may be applied to one side of each notch $f$, as in Fig. 3, for the purpose of preventing the ears $e$ from passing by the notches, when it is desired to remove the cover.

The cover has a series of small openings, $i$ $i$, which are closed by a pivoted plate, $j$, and which, when opened, serve to draw off the water without removing the solid matter from the vessel.

Having thus described our invention, we claim as new and desire to secure by Letters Patent—

1. The rod E, headed at one end and hooked at the other, combined, as described, with the bottom-perforated vessel D and perforated plate B, for the purpose of enabling them to be lifted out and removed together, in the manner specified.

2. In combination with vessel A, bottom-perforated vessel D, and perforated plate B, the tightly-fastened and perforated cover F, for the purpose of enabling the water to be poured from the three chambers, in the manner described.

PETER BOESEN.
MICHAEL BEDESSEM.

Witnesses:
LOUIS WALKER,
PETER GROSCH.